United States Patent
Umezaki et al.

(10) Patent No.: US 6,810,132 B1
(45) Date of Patent: Oct. 26, 2004

(54) TRAFFIC MONITORING APPARATUS

(75) Inventors: Yasushi Umezaki, Kawasaki (JP); Takafumi Edanami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 614 days.

(21) Appl. No.: 09/714,226

(22) Filed: Nov. 17, 2000

(30) Foreign Application Priority Data

Feb. 4, 2000 (JP) ........................................ 2000-032708

(51) Int. Cl.[7] .............................................. G06K 9/00
(52) U.S. Cl. ...................... 382/104; 701/117; 348/149
(58) Field of Search ................................. 382/104, 107; 340/435, 436, 903, 907; 348/148, 149; 701/117, 301

(56) References Cited

U.S. PATENT DOCUMENTS

| | | | | |
|---|---|---|---|---|
| 6,327,536 | B1 | * 12/2001 | Tsuji et al. ................. | 701/301 |
| 6,476,855 | B1 | * 11/2002 | Yamamoto .................. | 348/148 |
| 2002/0008657 | A1 | *  1/2002 | Poore, Jr. .................... | 342/96 |
| 2002/0022927 | A1 | *  2/2002 | Lemelson et al. .......... | 701/301 |

FOREIGN PATENT DOCUMENTS

| | | | | |
|---|---|---|---|---|
| JP | 06203290 A | 7/1994 | ............ | G08G/1/00 |
| JP | 06266840 A | 9/1994 | ............ | G06F/15/70 |
| JP | 08116528 A | 5/1996 | ............ | H04N/7/18 |
| JP | 10040490 A | 2/1998 | ............ | G08G/1/00 |
| JP | 11203481 A | 7/1999 | ............ | G06T/7/20 |

* cited by examiner

*Primary Examiner*—Leo Boudreau
*Assistant Examiner*—Ryan J. Miller
(74) *Attorney, Agent, or Firm*—Staas & Halsey LLP

(57) ABSTRACT

A traffic monitoring apparatus that is used to reliably detect the occurrence of an abnormal situation, such as a traffic accident. An imaging device produces and outputs images of a point to be monitored at predetermined intervals. Image inputting unit of the traffic monitoring apparatus inputs images output from the imaging device. Move vector extracting unit first generates a background image from a plurality of images input, then specifies areas where a moving object exists by calculating the difference between the background image and a newly input image, and then extracts move vectors from the specified areas. Parameter calculating unit calculates the slope and intercept, being parameters, of a move vector by considering the move vector as a segment. Plotting unit plots parameters for each move vector in a two-dimensional coordinate system with slope and intercept as its bases. Abnormality judging unit judges, in the case of the parameters being plotted in an unusual area, that an abnormal situation has occurred and informs a control center etc. (not shown) via a network of this.

10 Claims, 16 Drawing Sheets

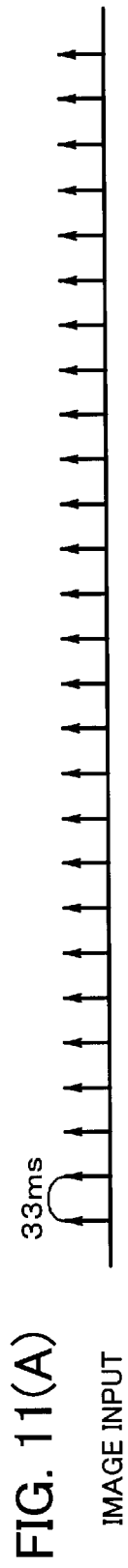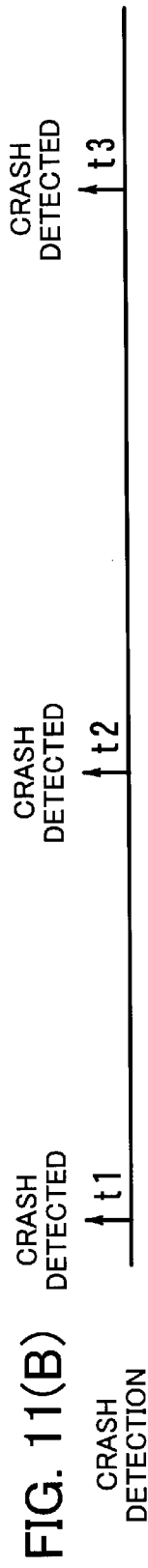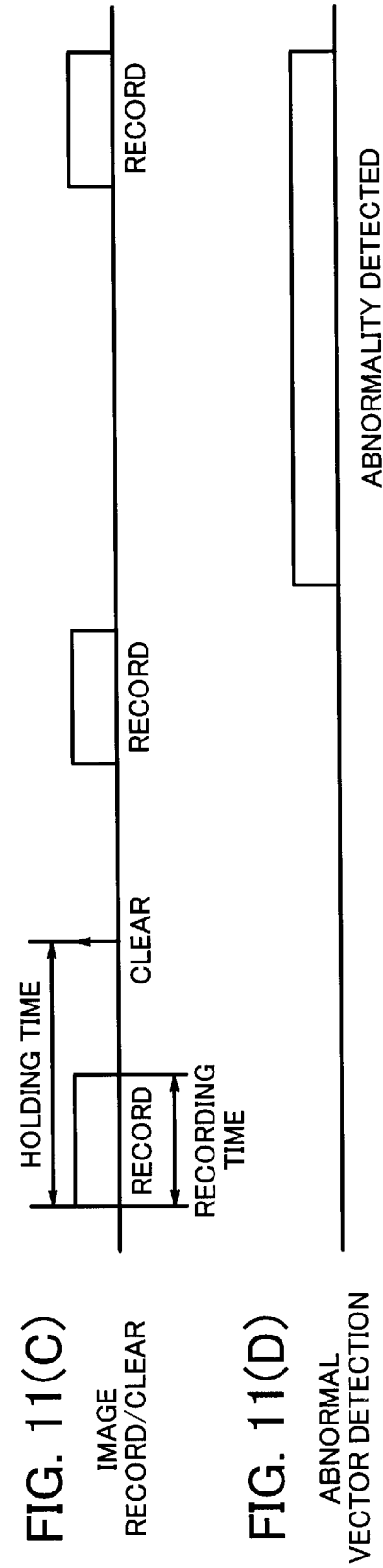

TRAFFIC MONITORING APPARATUS

BACKGROUND OF THE INVENTION (1) Field of the Invention

This invention relates to a traffic monitoring apparatus and, more particularly, to a traffic monitoring apparatus for detecting an abnormality in traffic by monitoring images produced by an imaging device.

(2) Description of the Related Art

In recent years intelligent transport systems (ITS), being new road systems which unite vehicle and telecommunications field and the road and traffic field, are expected to be social infrastructure which creates a market for various industries.

ITS aims at car navigation of a high order, automatic toll collection on toll roads, support for safe driving, and the like by making the best use of telecommunications technology and building humans, roads, and vehicles as a unitary system.

In order to optimally manage humans, roads, and vehicles as a system, it is necessary to always monitor the traffic situation and perform optimal control according to the situation. Therefore, traffic monitoring apparatuses for monitoring the traffic situation must be located at key points on a road to collect information.

Conventionally, the following two types of apparatuses were proposed as such a traffic monitoring apparatus.

(1) Japanese Patent Laid-Open Publication No.Hei8-116528 discloses an apparatus for detecting an accident by the noise of a vehicle crash.

(2) Japanese Patent Laid-Open Publication No.Hei10-40490 discloses an apparatus for detecting an accident by an image.

In the former method, as shown in FIG. 15, mike m1 is located at a point to be monitored to detect a power spectrum specific to a ultrasonic range occurring when vehicles V1 and V2 crash. If a plurality of mikes are located, the direction in which a crash has occurred also can be presumed to some extent on the basis of time lags between crash noises detected by these mikes.

In the latter method, as shown in FIG. 16, camera C1 is located at a point to be monitored to detect move vector MV1 of vehicle V1 and move vector MV2 of vehicle V2 from images produced. If these move vectors intersect, it will be decided that an accident has occurred.

With the former method, however, it is difficult to detect accidents, such as one resulting in injury or death, where crash noise does not occur.

Moreover, with the latter method, image processing must be performed to detect a move vector. This processing is time-consuming, so a computer with excellent throughput must be used to realize a practical processing level, resulting in a high cost. In addition, this method detects only the intersection of vectors, being an event occurring in a short time, so precision in detecting an accident is not very high. That is to say, detecting errors occur frequently.

SUMMARY OF THE INVENTION

In order to address such a problem, the present invention was made. In other words, an object of the present invention is to provide a traffic monitoring apparatus which can detect an accident resulting in injury or death and detect an accident with high precision.

In order to achieve the above object, a traffic monitoring apparatus for detecting an abnormality in traffic by monitoring images produced by an imaging device is provided. This traffic monitoring apparatus comprises image inputting means for inputting images produced by the imaging device, move vector extracting means for extracting a move vector of an object from images input from the image inputting means, parameter calculating means for calculating parameters in the case of a move vector extracted by the move vector extracting means being considered as a segment, plotting means for plotting parameters for a segment calculated by the parameter calculating means in a two-dimensional coordinate system with the parameters as its bases, and abnormality judging means for judging, in the case of parameters for a segment plotted by the plotting means having been plotted in an unusual area, that an abnormality has occurred.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIGS. 11(A), 11(B), 11(C), and 11(D) are timing charts showing examples of results obtained by the processes in the flow chart shown in FIG. 10;

FIG. 11(A) shows the timing of frame images input from a TV camera;

FIG. 11(B) shows the result of a crash detecting process in step S82;

FIG. 11(C) shows the image record/clear state of an image recorder;

FIG. 11(D) shows the result of an abnormality detecting process by vector patterns in step S90;

DESCRIPTION OF THE PREFERRED EMBODIMENTS

An embodiment of the present invention will now be described with reference to the drawings.

Figure 1:
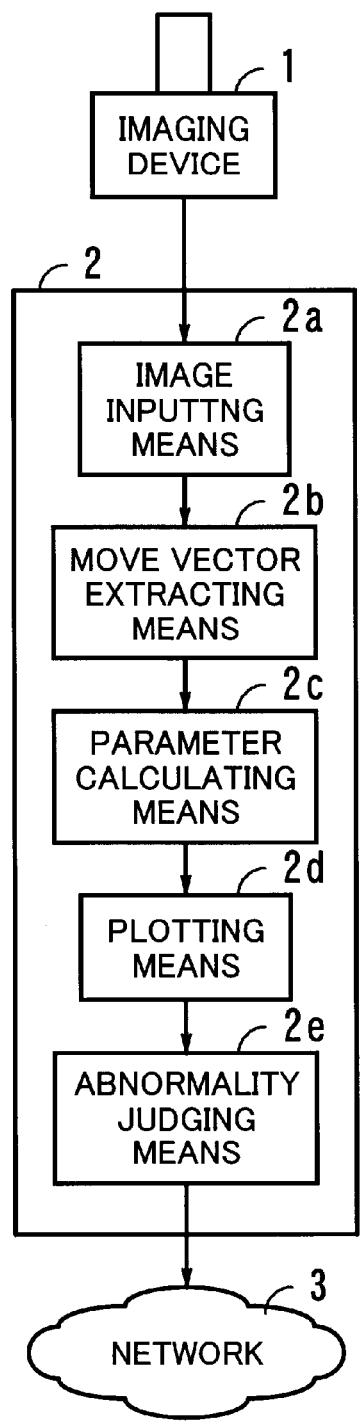
FIG. 1 is a view for describing the operating principle of the present invention.

FIG. 1 is a view for describing the operating principle of the present invention. As shown in FIG. 1, a traffic monitoring apparatus 2 according to the present invention comprises image inputting means 2a, move vector extracting means 2b, parameter calculating means 2c, plotting means 2d, and abnormality judging means 2e and an imaging device 1 and a network 3 are externally connected to the traffic monitoring apparatus 2.

The imaging device 1 consists of, for example, a television (TV) camera. It produces and outputs images of a point to be monitored at predetermined intervals.

The image inputting means 2a inputs images output from the imaging device 1.

The move vector extracting means 2b extracts a move vector of an object from images input from the image inputting means 2a.

The parameter calculating means 2c calculates parameters in the case of a move vector extracted by the move vector extracting means 2b being considered as a segment.

The plotting means 2d plots parameters for a segment calculated by the parameter calculating means 2c in a two-dimensional coordinate system with the parameters as its bases.

The abnormality judging means 2e judges, in the case of parameters for a segment plotted by the plotting means 2d having been plotted in an unusual area, that an abnormal situation has occurred.

The network 3 is a communication line consisting of, for example, optical fibers and sends a control center etc. (not shown) data collected from each point to be monitored.

Now, operations in FIG. 1 will be described.

Figure 2:
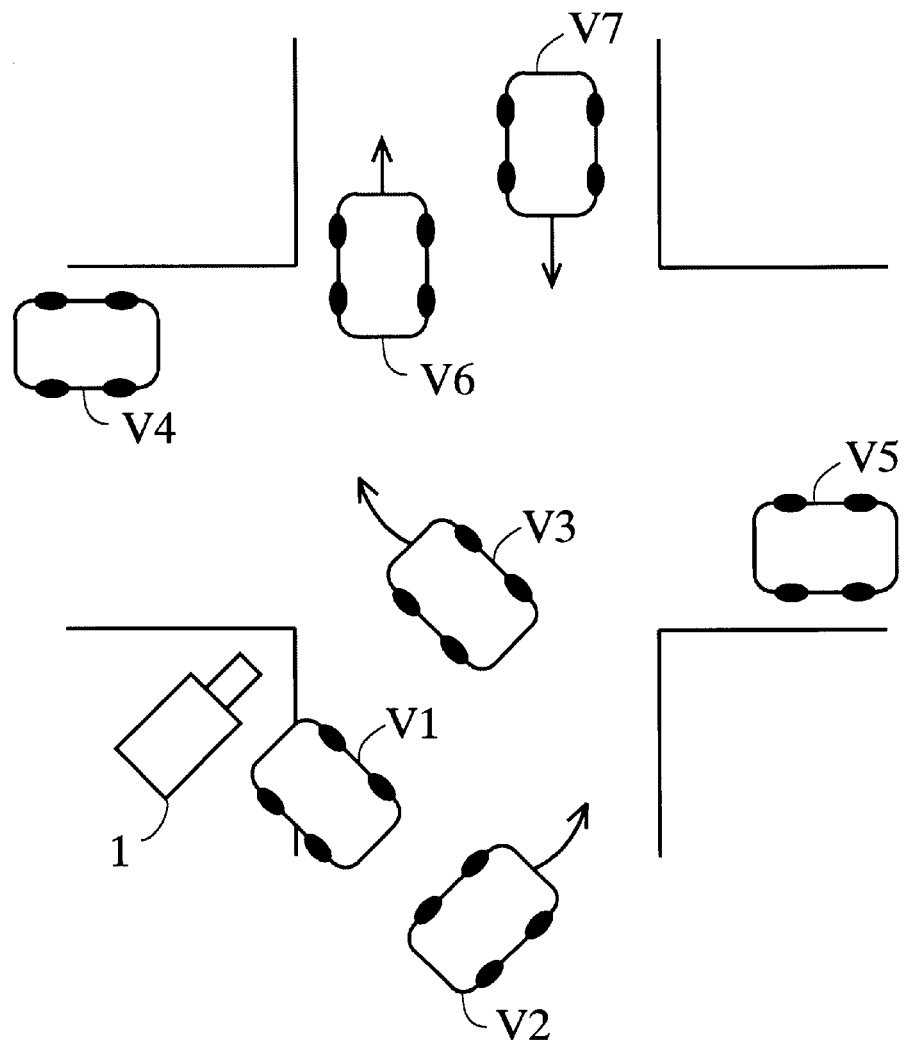
FIG. 2 is a view showing an example of the traffic situation at a point to be monitored.

It is assumed that the imaging device 1 has been located at a crossing, as shown in FIG. 2. If vehicle V1 causes an accident and stops at the roadside, unusual movements of vehicles V2 and V3 traveling down the vicinity of vehicle V1 will be seen. The additional vehicles V4 through V7 shown in FIG. 2 may also have to react. In the present invention, the occurrence of an abnormal situation is detected by detecting such an unusual movement of a vehicle. This will now be described in detail.

Images output from the imaging device 1 are imported into the traffic monitoring apparatus 2 by the image inputting means 2a.

The move vector extracting means 2b extracts a move vector of a vehicle (or a passerby) by comparing an image input by the image inputting means 2a at time (t−1) and one input at time t.

Figure 3:
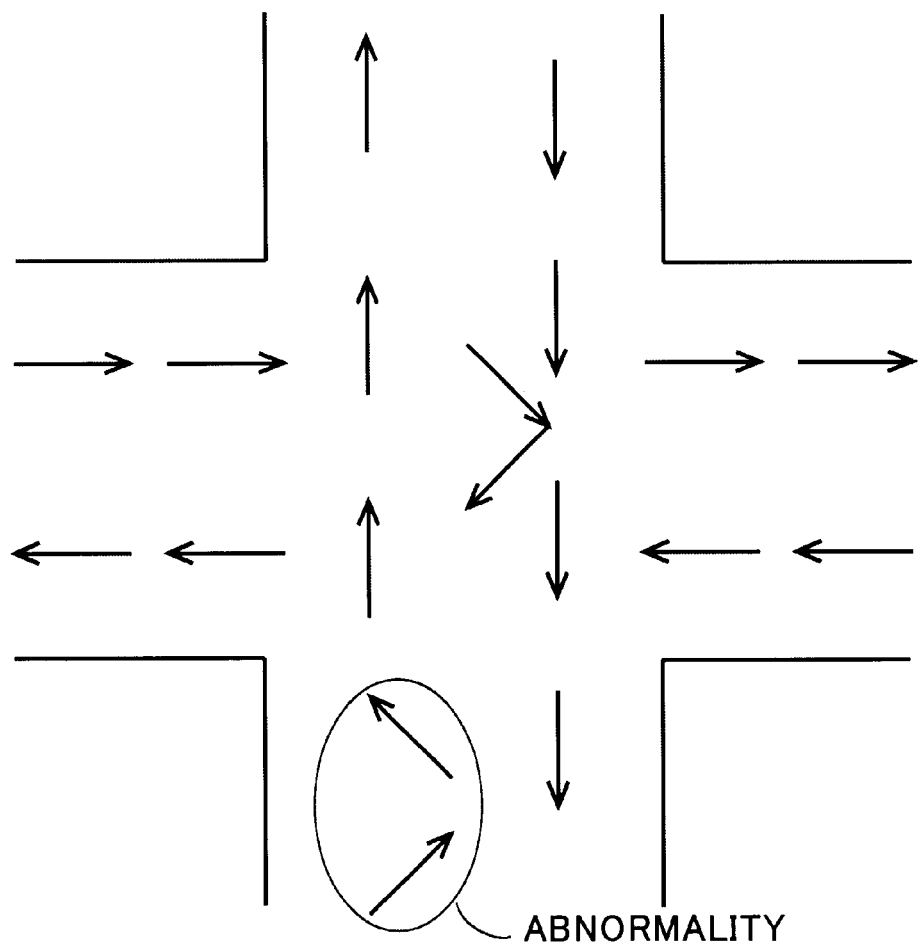
FIG. 3 is an example of the vehicles shown in FIG. 2 being indicated by move vectors.

FIG. 3 is a view showing an example of move vectors extracted from the example shown in FIG. 2 by the move vector extracting means 2b. This example shows that the vehicles traveling down the vicinity of vehicle V1 shown in FIG. 3 which has caused an accident move in an unusual way.

The parameter calculating means 2c considers move vectors extracted by the move vector extracting means 2b as segments and performs Hough transformation on each segment to calculate its slope and intercept as parameters.

Figure 4:
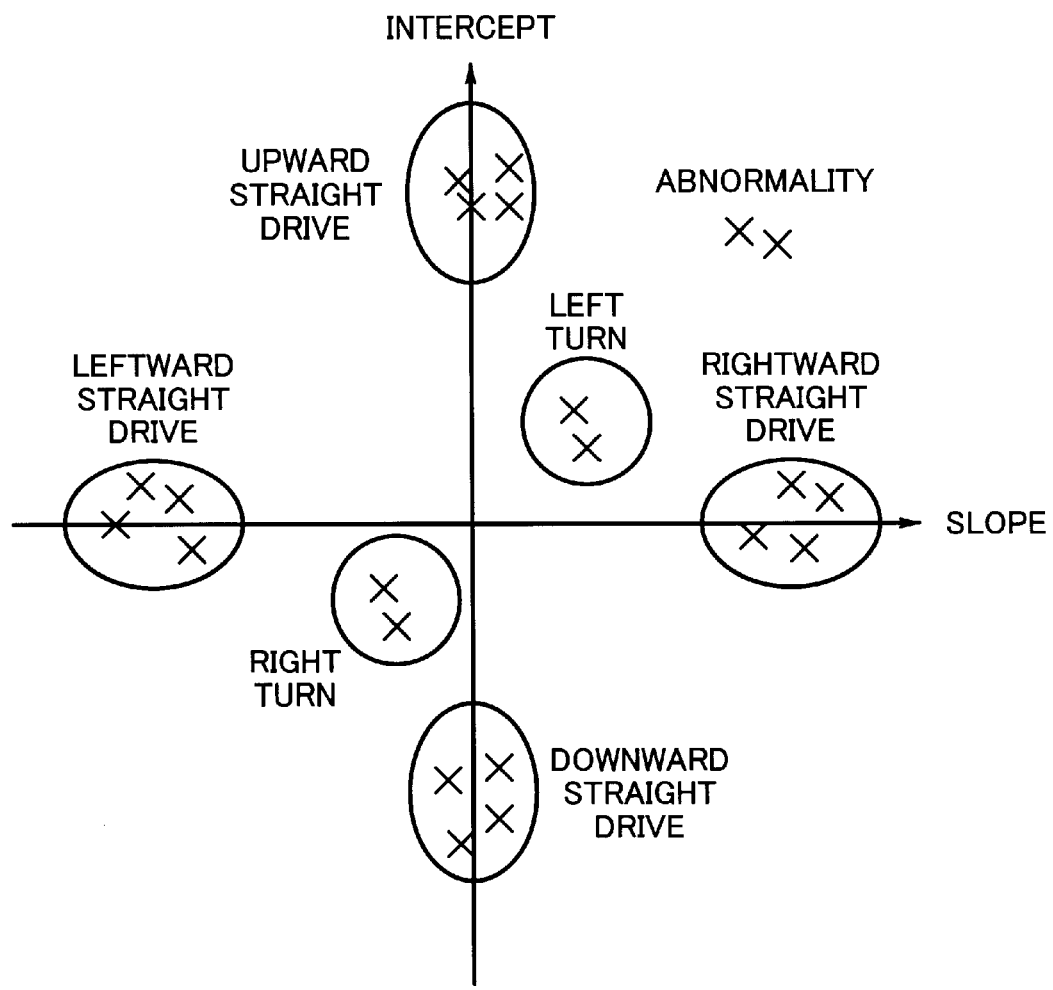
FIG. 4 is a view showing the distribution of the move vectors shown in FIG. 3 which are Hough-transformed and plotted in a two-dimensional coordinate system.

The plotting means 2d plots the obtained parameters for each segment in a two-dimensional coordinate system with slope and intercept as its bases. FIG. 4 is a view showing plotted results. As shown in FIG. 4, each parameter will be plotted in a predetermined area according to the pattern of a move vector. For example, "upward straight drives" are plotted convergently in the upper middle area of the coordinate system and "downward straight drives" are plotted convergently in the lower middle area of the coordinate system.

The abnormality judging means 2e refers to results plotted by the plotting means 2d to judge, in the case of parameters for a move vector having been plotted in an unusual area, that an abnormal situation has occurred and informs a control center (not shown) via the network 3 of this.

For example, it is assumed that vehicle V1 has caused an accident, as shown in FIG. 2. At the time of the accident, vehicle V1 moves in an unusual way, so an abnormality first will be detected by its move vector. And then a second abnormality will be detected by evasive action taken by vehicles traveling down the vicinity of vehicle V1.

Even if an abnormality in a move vector of vehicle V1 disappears in a short time, evasive action taken by vehicles traveling down the vicinity of vehicle V1 will continue until vehicle V1 is cleared away. The occurrence of an abnormal situation therefore can be detected reliably with both the abnormalities as criteria for judging.

In the present invention, as described above, the movement of move vectors is monitored by patterns, which makes it possible to reliably detect the occurrence of an abnormal situation involved in an accident.

It is assumed that an accident resulting in injury or death has occurred. Vehicles etc. are expected to take evasive action and pedestrians also can be detected. Therefore, an accident resulting in injury or death also can be detected reliably.

The configuration of an embodiment of the present invention will now be described.

Figure 5:
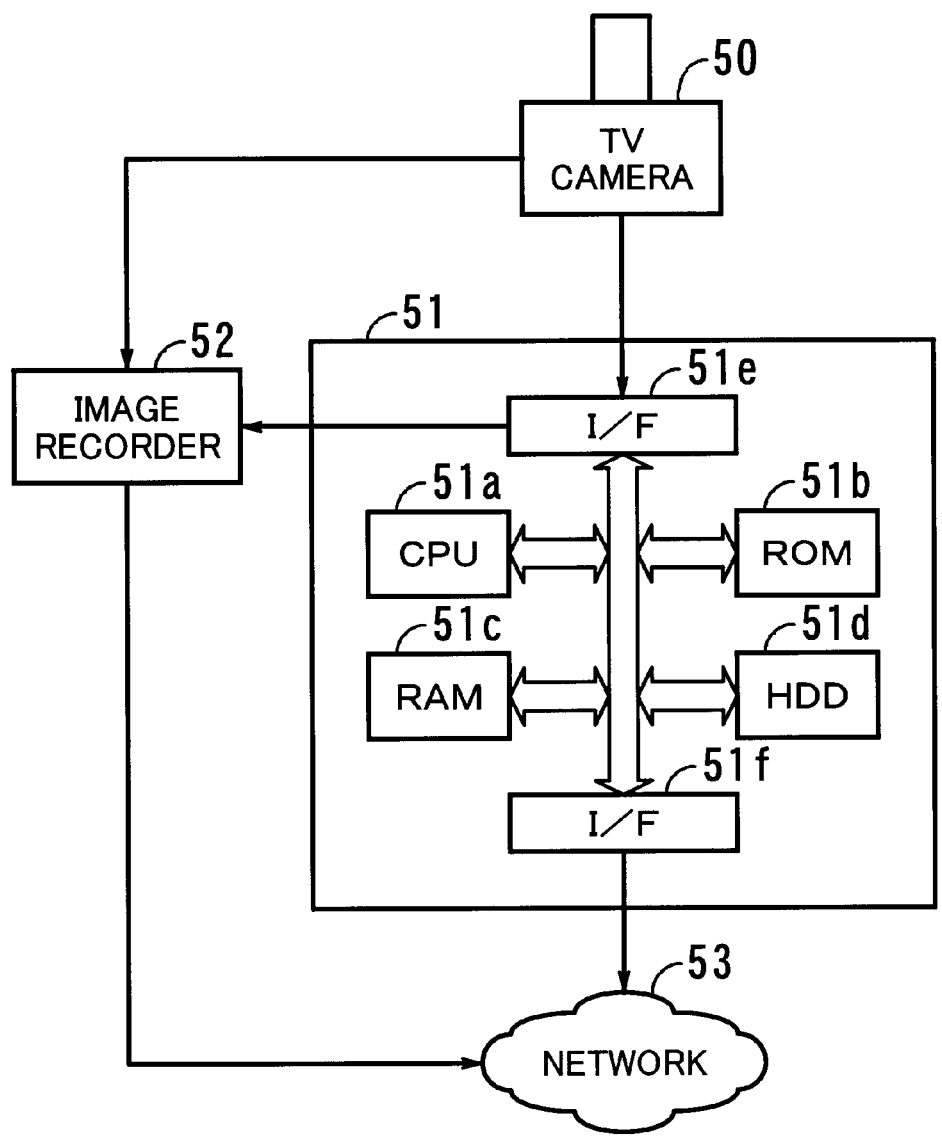
FIG. 5 is a block diagram showing the configuration of a first embodiment of the present invention.

FIG. 5 is a block diagram showing the configuration of the embodiment of the present invention. In FIG. 5, a TV camera 50 is located at a point to be monitored and produces and outputs images of vehicles and pedestrians as objects.

A traffic monitoring apparatus 51 comprises a central processing unit (CPU) 51a, a read only memory (ROM) 51b, a random access memory (RAM) 51c, a hard disk drive (HDD) 51d, and interfaces (I/F) 51e and 51f. The traffic monitoring apparatus 51 detects the occurrence of an accident by performing predetermined processes on images output from the TV camera 50, informs a control center of it, and records circumstances at the time of the accident by controlling an image recorder 52.

The CPU 51a performs various operations and controls each section of the apparatus, in compliance with programs stored in the HDD 51d etc.

The ROM 51b stores basic programs executed by the CPU 51a, data, and the like.

The RAM 51c temporarily stores programs being executed by the CPU 51a, data being operated by the CPU 51a, and the like.

The HDD 51d stores programs executed by the CPU 51a, data, and the like.

The I/F 51e converts image signals (analog signals) output from the TV camera 50 into digital signals, inputs them, and converts a data format properly when it sends information to and receives information from the image recorder 52.

The I/F 51f, for example, converts a data format and protocol when it sends information to and receives information from the control center (not shown) via a network 53.

The image recorder 52 consists of, for example, a video tape recorder (VTR) etc. and records images output from the TV camera 50 in compliance with control signals sent from the traffic monitoring apparatus 51.

The network 53 is a communication line consisting of, for example, optical fibers and sends the control center etc. (not shown) data collected from the traffic monitoring apparatus 51.

Now, operations in the above embodiment will be described.

Figure 6:
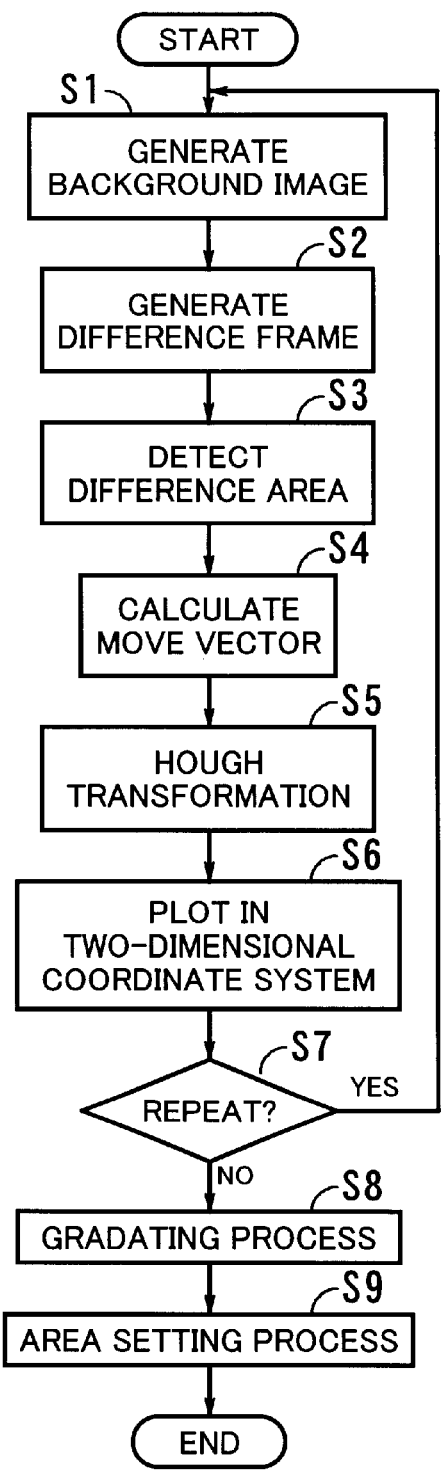
FIG. 6 is a flow chart for describing an example of processes performed in the case of setting usual areas in the embodiment shown in FIG. 5.

FIG. 6 is a flow chart for describing an example of processes performed with the traffic monitoring apparatus 51 shown in FIG. 5 in the initial state. This is the process of extracting a move vector from a plurality of pieces of image data in the case of an abnormal situation, such as an accident, not having occurred, performing Hough transformation on it, and plotting the parameters obtained in a two-dimensional coordinate system to set a usual area (area in which the parameters are plotted in the case of an abnormal situation not having occurred). The following procedure will be performed in compliance with this flow chart.

[S1] The CPU 51a inputs an image sent from the TV camera 50 (frame image) and performs the process for generating a background image.

In other words, the CPU 51a stores frame image F(n) ($n \geq 1$) in the RAM 51c and generates background image BF(n) from the stored frame image by using:

[Formula 1]

$$BF(n) = (1-\alpha)BF(n-1) + \alpha F(n) \quad (1)$$

where $\alpha$ is a forgetful coefficient ($0 < \alpha < 1$).

[S2] The CPU 51a calculates the difference between the background image obtained in step S1 and the frame image by using the following formula to generate difference frame MF(n). Background image BF(n) is the average of a plurality of images, so a difference frame, being the difference between a background image and the frame image, has a value only in an area where an object which moves (moving object) exists.

[Formula 2]

$$MF(n) = F(n) - BF(n) \quad (2)$$

[S3] The CPU 51a detects difference areas, being areas where a moving object exists, in the difference frame. That is to say, the CPU 51a detects areas with a value in the difference frame calculated in step S2 as difference areas.

[S4] The CPU 51a calculates move vector (dx, dy) for each of the difference areas detected in step S3 by using:

[Formula 3]

$$En(dx, dy) = \sum_{i,j} |MF_n(x+i, y+j) - MF_{n-1}(x+i+dx, y+j+dy)| \quad (3)$$

where i and j are the coordinates of a pixel which makes up a frame image and the origin (0, 0) lies at, for example, the upper left corner.

[S5] The CPU 51a calculates the slope and intercept of each move vector by performing Hough transformation on the move vectors obtained in step S4. To put it concretely, the CPU 51a calculates them in the following way:

If a is the slope of a move vector, b is the intercept of the move vector, $(X_t, Y_t)$ is the position of a moving object at time t, and $(X_{t-1}, Y_{t-1})$ is the position of the moving object at time (t−1), then the following relations exist among them:

[Formulae 4]

$$Y_t = aX_t + b$$
$$Y_{t-1} = aX_{t-1} + b \quad (4)$$

These formulae are transformed to:

[Formulae 5]

$$a = \frac{Y_t - Y_{t-1}}{X_t - X_{t-1}} \quad (5)$$

$$b = Y_t + \frac{Y_t - Y_{t-1}}{X_t - X_{t-1}} X_t$$

With Formulae 5, slope a and intercept b of a move vector are obtained.

[S6] The CPU 51a plots the parameters for the move vectors obtained in step S5 in a two-dimensional coordinate system with slope as its horizontal axis and intercept as its vertical axis.

If the processing of a predetermined amount of data is not completed, then the CPU 51a returns to step S1 to repeat the process further. If the processing of a predetermined amount of data is completed, then the CPU 51a proceeds to step S8.

The CPU 51a performs gradation processing on the two-dimensional coordinate system in which the parameters for a move vector were plotted. That is to say, the data plotted is a point, so an area will be formed out of a plurality of points by expanding the area of a point (gradating a point).

[S9] The CPU 51a detects areas where data exists in the two-dimensional coordinate system on which gradation processing was performed and sets the areas as usual areas. That is to say, as a result of this process, usual areas are set on the basis of the distribution (histogram) of parameters for a segment in a state in which an abnormal situation, such as an accident, has not occurred.

The process of judging from an input image, on the basis of the usual areas set in the above way, whether or not an accident has occurred will now be described with reference to FIG. 7.

Figure 7:
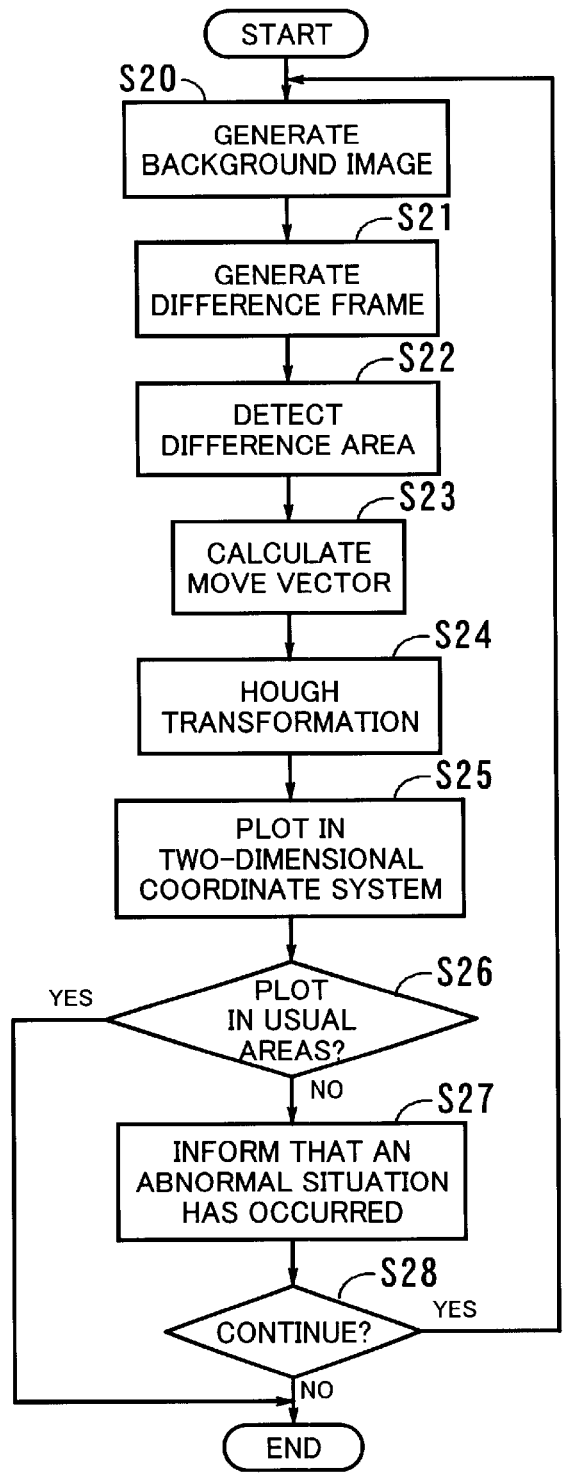
FIG. 7 is a flow chart for describing an example of processes for judging from an input image, by referring to the usual areas set by the processes shown in FIG. 6, whether or not an accident has occurred.

The following procedure will be performed in compliance with the flow chart shown in FIG. 7.

[S20] The CPU 51a generates a background image from a frame image input from the TV camera 50. Processes in steps S20 through S24 are the same as those in steps S1 through S5 shown in FIG. 6, so detailed descriptions of them will be omitted.

[S21] The CPU 51a calculates the difference between the background image obtained in step S20 and the frame image to generate a difference frame.

[S22] The CPU 51a calculates difference areas, being areas where a moving object exists, in the difference frame.

[S23] The CPU 51a calculates a move vector for each of the difference areas calculated in step S22.

[S24] The CPU 51a calculates the slope and intercept of each move vector by performing Hough transformation on the move vectors obtained in step S23.

[S25] The CPU 51a plots the parameters for the move vectors obtained in step S24 in a two-dimensional coordinate system with slope and intercept as its bases.

[S26] The CPU 51a judges whether or not the parameters for all move vectors are plotted in the usual areas. If the parameters for all move vectors are plotted in the usual areas, then the CPU 51a proceeds to step S28. If any of them are plotted outside the usual areas, then the CPU 51a proceeds to step S27.

[S27] The CPU 51a informs the control center (not shown) via the network 53 that an abnormal situation has occurred.

[S28] The CPU 51a judges whether it should continue the procedure. If it continues the procedure, then it returns to step S20 to repeat the same processes. If it does not continue the procedure, then it ends the procedure.

In the above procedure, move vectors are extracted from an image sent from the TV camera 50, Hough transformation is performed on them to generate parameters for a segment, and the judgment that an abnormal situation, such as an accident, has occurred is made when the parameters are plotted outside the usual areas. The occurrence of an accident therefore can be detected reliably both by the movement of a vehicle which has caused the accident and by that of other vehicles after the accident.

Furthermore, in the above procedure, a background image is generated first, then difference areas, being areas where a moving object exists, are specified from the difference between the background image and the frame image, and then move vectors are calculated. As a result, processing can be performed at a high speed by narrowing down objects to be processed.

Now, operations in the second embodiment of the present invention will be described. The configuration of the second embodiment of the present invention is the same as that shown in FIG. 5, so a detailed description of it will be omitted.

In the first embodiment, a move vector plotted outside the usual area is judged to be abnormal by calculating the slope and intercept of a move vector considered as a segment and plotting the slope and intercept obtained in a two-dimensional coordinate system with these parameters as its bases.

In the second embodiment, the future positions of a pair of moving objects randomly selected are predicted, and the judgment that a crash has occurred is made when the distance between them falls below a predetermined threshold.

Figure 8:
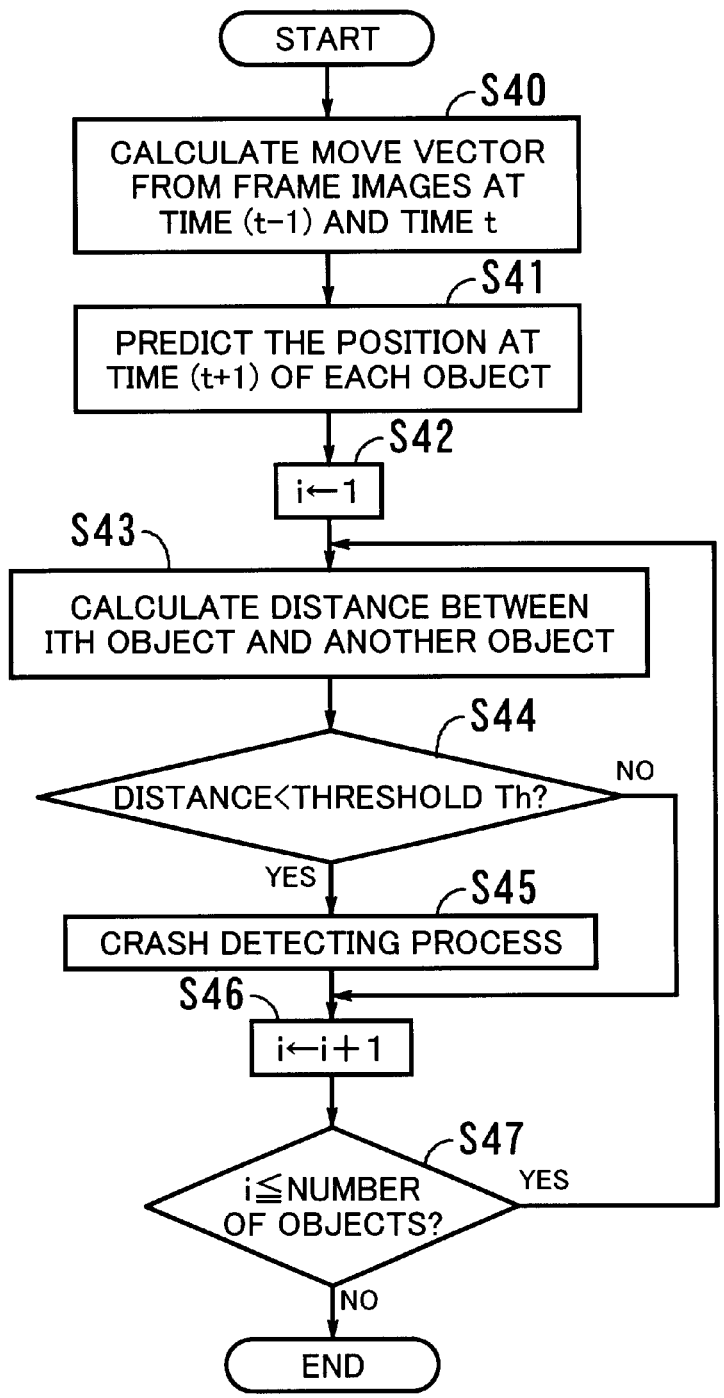
FIG. 8 is a flow chart for describing an example of processes performed in a second embodiment of the present invention.

FIG. 8 is a flow chart for realizing such a process. The following procedure will be performed in compliance with this flow chart.

[S40] The CPU 51a inputs frame images at time (t−1) and time t from the TV camera 50 and calculates move vectors. In this case, methods which are the same as those in steps S1 through S4 shown in FIG. 6 are used. To put it concretely, move vector ($\Delta X$, $\Delta Y$) is given by:

[Formulae 6]

$$\Delta X = X_1 - X_{t-1}$$
$$\Delta Y = Y_1 - Y_{t-1} \quad (6)$$

[S41] The CPU 51a predicts the position at time (t+1) of each moving object. To put it concretely, the CPU 51a calculates the position at time (t+1) of each moving object by:

[Formula 7]

$$(X_1 + \Delta X, Y_t + \Delta Y) \quad (7)$$

[S42] The CPU 51a initializes variable i to "1."

[S43] The CPU 51a calculates the distance between an ith moving object and another moving object. In this case, the position of the ith moving object is given by:

[Formula 8]

$$X_{1,t} + \Delta X_{i,t}, Y_{i,t} + \Delta Y_{i,t}) \quad (8)$$

Distance $R_{ij}$ between the ith moving object and a jth moving object, being another moving object, is given by:

[Formula 9]

$$R_{ij} = \sqrt{((X_{i,t} + \Delta X_{i,t}) - (X_{j,t} + \Delta X_{j,t}))^2 + ((Y_{i,t} + \Delta Y_{i,t}) - (Y_{j,t} + \Delta Y_{j,t}))^2} \quad (9)$$

[S44] If distance $R_{ij}$ calculated in step S43 falls below predetermined threshold Th, then the CPU 51a proceeds to step S45. If distance $R_{ij}$ calculated in step S43 does not fall below predetermined threshold Th, then the CPU 51a proceeds to step S46.

[S45] The CPU 51a performs a crash process, being a process performed when the crash of a moving object is detected. To put it concretely, the CPU 51a informs the control center (not shown) via the network 53 that an accident has occurred.

[S46] The CPU 51a increments the value of variable i by "1."

[S47] If the value of variable i is smaller than or equal to the number of moving objects, then the CPU 51a returns to step S43 to repeat the same processes. If the value of variable i is greater than the number of moving objects, then the CPU 51a ends the processes.

In the above procedure, a background image is generated first, then difference areas, being areas where a moving object exists, are specified from the difference between the background image and the frame image, and then move vectors are calculated. As in the first embodiment, therefore, processing can be performed at a high speed by narrowing down objects to be processed.

Furthermore, the future position of a moving object is predicted from its move vector, and the judgment that a crash has occurred is made when the distance between a pair of moving objects randomly selected falls below a predetermined threshold. A crash therefore can be detected reliably.

Moreover, pedestrians can be treated as moving objects, which makes it possible to detect an accident resulting in injury or death.

In addition, areas where vehicles get particularly close to each other, for example, can be detected by properly selecting a threshold. Therefore, action, such as repairing a road, can be taken on the basis of the results.

In the above embodiment, the distance for all combinations of moving objects is calculated when the distance between the ith and jth moving objects is calculated. Action to avoid duplication which occurs in this case may be taken.

Now, operations in the third embodiment of the present invention will be described. The configuration of the third embodiment of the present invention is the same as that shown in FIG. 5, so a detailed description of it will be omitted.

In the above second embodiment, the future positions of a pair of moving objects randomly selected are predicted from their move vectors, and the judgment that a crash has occurred is made when the distance between them falls below a predetermined threshold.

In the third embodiment, whether or not a crash has occurred is judged on the basis of not only move vectors (a kind of velocity vector) but also acceleration vectors.

Figure 9:
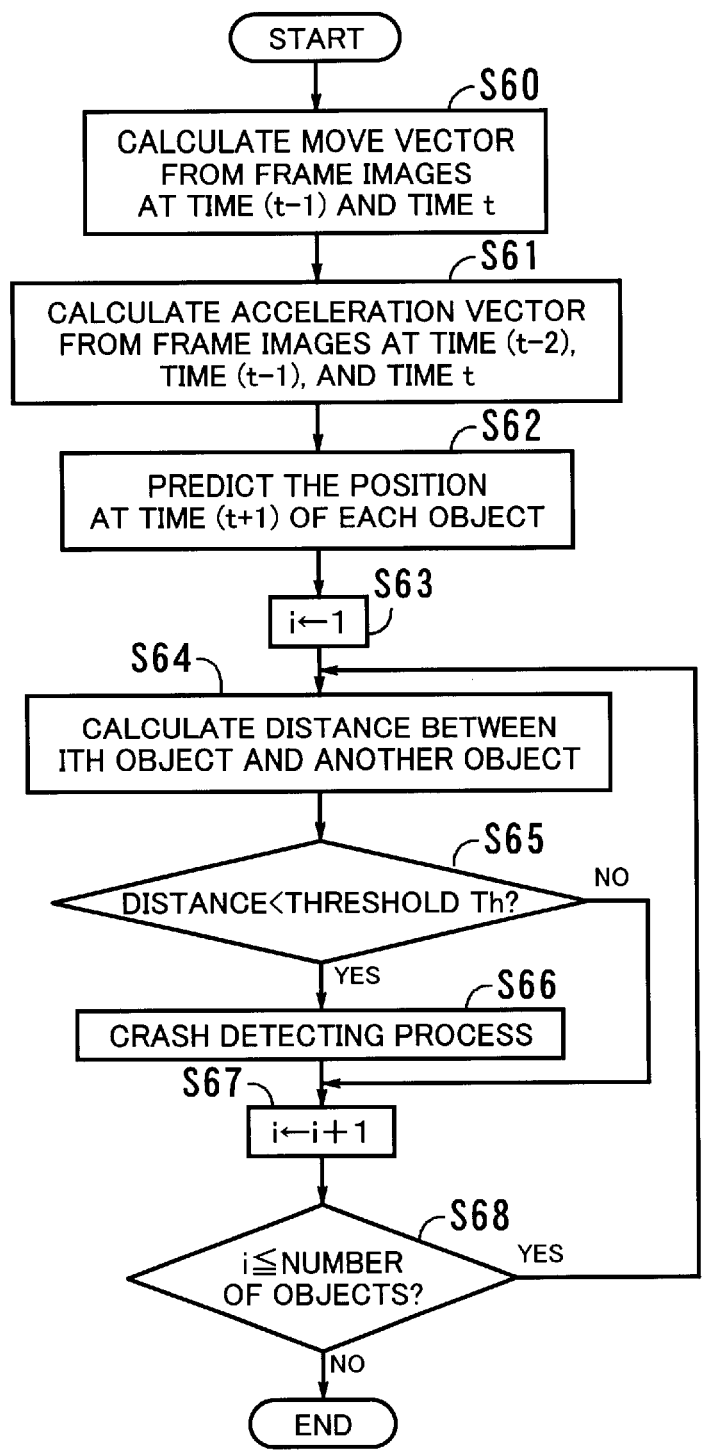
FIG. 9 is a flow chart for describing an example of processes performed in a third embodiment of the present invention.

FIG. 9 is a flow chart for realizing such a process. The following procedure will be performed in compliance with this flow chart.

[S60] The CPU 51a inputs frame images at time (t−1) and time t from the TV camera 50 and calculates move vectors. This process is the same as that in step S40 shown in FIG. 8.

[S61] The CPU 51a inputs frame images at time (t−2), time (t−1), and time t from the TV camera 50 and extracts acceleration vector (ΔX', ΔY') by substituting them in:
[Formula 10]

$$\Delta X' = X_t - 2X_{t-1} + X_{t-2}$$
$$\Delta Y' = Y_t - 2Y_{t-1} + Y_{t-2} \quad (10)$$

[S62] The CPU 51a predicts the position at time (t+1) of each moving object. To put it concretely, the CPU 51a calculates the position at time (t+1) of each moving object by:
[Formula 11]

$$\left(X_t + \Delta X_t + \frac{\Delta X'}{2}, Y_t + \Delta Y + \frac{\Delta Y'}{2}\right) \quad (11)$$

[S63] The CPU 51a initializes variable i to "1."

[S64] The CPU 51a calculates the distance between an ith moving object and another moving object. In this case, the position of the ith moving object is given by:
[Formulae 12]

$$\left(X_{i,t} + \Delta X_{i,t} + \frac{\Delta X_{i,t'}}{2}, Y_{i,t} + \Delta Y_{i,t} + \frac{\Delta Y_{i,t'}}{2}\right) \quad (12)$$

Distance $R_{ij}$ between the ith moving object and a jth moving object, being another moving object, is given by:
[Formula 13]

$$R_{ij} = \sqrt{\left(\left(X_{i,t} + \Delta X_{i,t} + \frac{\Delta X_{i,t'}}{2}\right) - \left(X_{j,t} + \Delta X_{j,t} + \frac{\Delta X_{j,t'}}{2}\right)\right)^2 + \left(\left(Y_{i,t} + \Delta Y_{i,t} + \frac{\Delta Y_{i,t'}}{2}\right) - \left(Y_{j,t} + \Delta Y_{j,t} + \frac{\Delta Y_{j,t'}}{2}\right)\right)} \quad (13)$$

[S65] If distance $R_{ij}$ calculated in step S64 falls below predetermined threshold Th, then the CPU 51a proceeds to step S66. If distance $R_{ij}$ calculated in step S64 does not fall below predetermined threshold Th, then the CPU 51a proceeds to step S67.

[S66] The CPU 51a performs a crash process, being a process performed when the crash of a moving object is detected. To put it concretely, the CPU 51a informs the control center (not shown) via the network 53 that an accident has occurred.

[S67] The CPU 51a increments the value of variable i by "1."

[S68] If the value of variable i is smaller than or equal to the number of moving objects, then the CPU 51a returns to step S64 to repeat the same processes. If the value of variable i is greater than the number of moving objects, then the CPU 51a ends the processes.

In the above procedure, whether or not a crash has occurred is judged on the basis of not only the velocity but also the acceleration of a moving object. Whether or not a vehicle crash has occurred can be detected reliably even at a point (near a crossing, for example) where a vehicle accelerates or decelerates frequently.

Now, operations in the fourth embodiment of the present invention will be described. The configuration of the fourth embodiment of the present invention is the same as that shown in FIG. 5, so a detailed description of it will be omitted.

In the fourth embodiment, first, the crash of a moving object is detected in compliance with the same processes with the second or third embodiment. Then whether or not a crash really has occurred is verified in compliance with the same processes with the first embodiment and, if the judgment that a crash really has occurred is made, images are recorded.

Figure 10:
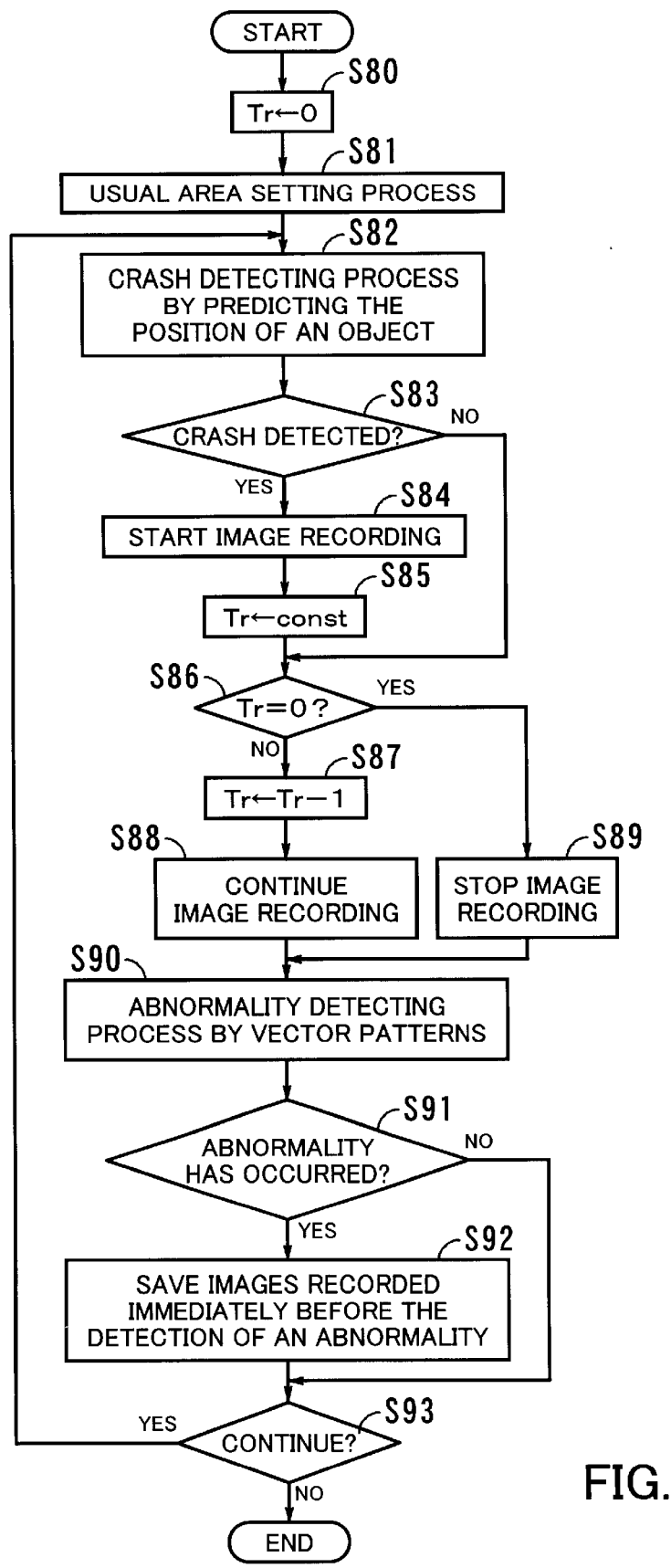
FIG. 10 is a flow chart for describing an example of processes performed in a fourth embodiment of the present invention.

FIG. 10 is a flow chart for realizing such a process. The following procedure will be performed in compliance with this flow chart.

[S80] The CPU 51a initializes variable Tr used to manage image recording time to "0."

[S81] The CPU 51a performs the usual area setting process shown in FIG. 6.

[S82] The CPU 51a performs the crash detecting process by predicting the position of an object shown in FIG. 8 or 9.

[S83] If a crash is detected, then the CPU 51a proceeds to step S84. If a crash is not detected, then the CPU 51a proceeds to step S86.

[S84] The CPU 51a sends control signals to the image recorder 52 to start image recording.

[S85] The CPU 51a substitutes predetermined constant const for the variable. Constant const is set according to image recording time.

[S86] If the value of variable Tr is "0," then the CPU 51a proceeds to step S89. If the value of variable Tr is not "0," then the CPU 51a proceeds to step S87.

[S87] The CPU 51a decrements the value of variable Tr by "1."

[S88] The CPU 51a continues image recording.

[S89] The CPU 51a stops image recording.

[S90] The CPU 51a performs an abnormality detecting process by a vector pattern in compliance with the procedure shown in FIG. 7.

[S91] If the judgment that an abnormality has occurred is made in step S90, then the CPU 51a proceeds to step S92. If the judgment that an abnormality has occurred is not made in step S90, then the CPU 51a proceeds to step S93.

[S92] The CPU 51a saves images recorded immediately before the detection of an abnormality. That is to say, for example, the CPU 51a sends images which start to be recorded in step S84 to the control center via the network 53 and saves them there.

[S93] The CPU 51a judges whether it should continue the procedure. If it continues the procedure, then it returns to step S82 to repeat the same processes. If it does not continue the procedure, then it ends the procedure.

If an abnormality is not detected by the process in step S90 within a predetermined time (holding time described later) after the start of image recording, a process for clearing recorded images is performed in parallel. This is not shown in FIG. 10.

FIGS. 11(A), 11(B), 11(C), and 11(D) are timing charts showing an example of the results of performing the above procedure. FIG. 11(A) shows the timing of frame images input from the TV camera 50. In this example, frame images are input every 33 milliseconds.

FIG. 11(B) shows the result of the crash detecting process in step S82. In this example, crashes are detected at time t1, t2, and t3.

FIG. 11(C) shows the image record/clear state of the image recorder 52. FIG. 11(D) shows the result of the abnormality detecting process by vector patterns in step S90. As shown in FIG. 11(D), image recording starts immediately after the detection of a crash and continues for a predetermined time (time corresponding to const in step S85). The images recorded are held for a fixed time (holding time).

These images are forwarded to the control center and are saved there only if an abnormal vector is detected during this period. If an abnormal vector is not detected during this period, then they are cleared. In this example, an abnormal vector is not detected after the detection of a crash at time t1, so the images recorded are cleared. An abnormal vector is detected after the detection of a crash at time t2, so the images recorded are forwarded to the control center instead of being cleared. Again an abnormal vector is detected during the detection of a crash at time t3, so the images recorded then are forwarded to the control center instead of being cleared.

In the above embodiments, when a crash is detected by the crash detecting process, whether or not an accident has occurred is verified reliably by the abnormality detecting process. As a result, precision in detecting an accident can be improved.

In addition, image recording starts when a crash is detected by the crash detecting process and the images recorded are forwarded to the control center and saved there only if an abnormality is detected by the abnormality detecting process after that. Therefore, the images recorded when an accident has occurred can be saved reliably.

Now, the fifth embodiment of the present invention will be described.

Figure 12:
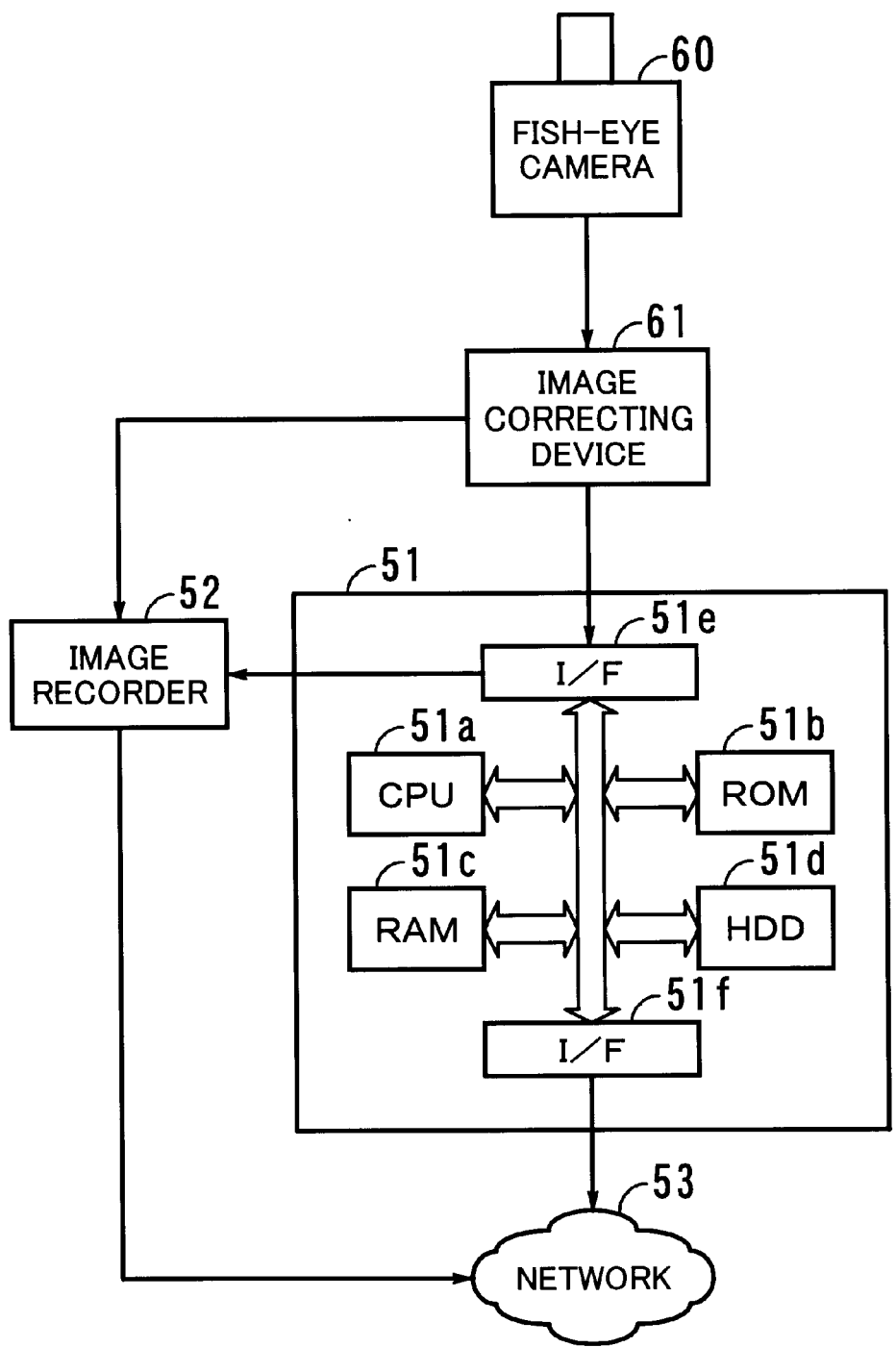
FIG. 12 is a block diagram showing the configuration of a fifth embodiment of the present invention.

FIG. 12 is a block diagram showing the configuration of the fifth embodiment of the present invention. Sections shown in FIG. 12 which correspond to those in FIG. 5 have the same signs and descriptions of them will be omitted. In this embodiment, a fish-eye camera 60 is connected instead of the TV camera 50. Moreover, an image correcting device 61 is located between the fish-eye camera 60 and the traffic monitoring apparatus 51. The configuration is the same with FIG. 5 except for the above.

The fish-eye camera 60 is a TV camera equipped with a fisheye lens, being a super-wide-angle lens, and widely produces images of a point to be monitored.

The image correcting device 61 performs, for example, a rendering process on images supplied from the fish-eye camera 60 so that images unique to a fisheye lens whose central areas are magnified look like images produced with a usual lens.

Figure 13:
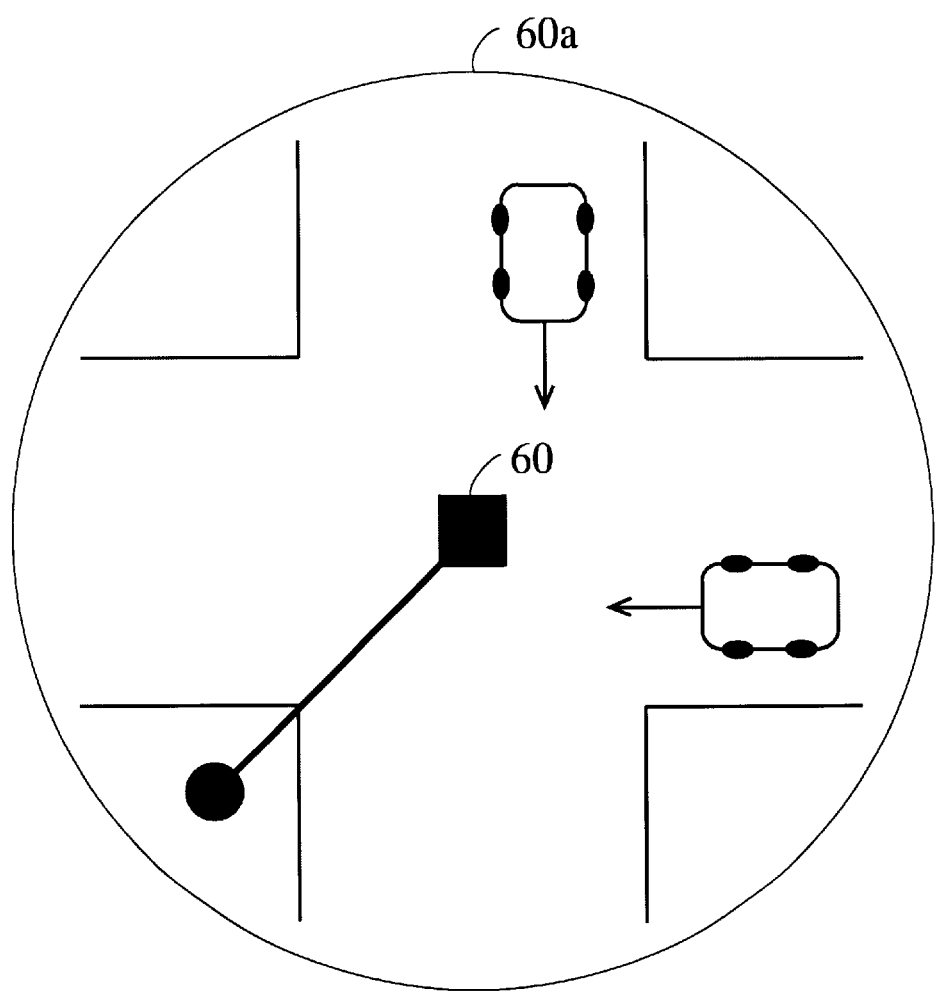
FIG. 13 is a view showing the location of the fish-eye camera shown in FIG. 12 and its field of view.

Operations in the above embodiment will now be described. As shown in FIG. 13, the fish-eye camera 60 is located at a predetermined position over a point to be monitored and produces and outputs images of a field 60a enclosed with a circle.

The image correcting device 61 performs, for example, a rendering process on images output from the fish-eye camera 60 in order to convert images unique to a fisheye lens whose central areas are magnified into usual distortionless ones.

Images output from the image correcting device 61 are supplied to the traffic monitoring apparatus 51, where the same processes that have been described above are performed on them to detect an abnormality in traffic.

In the above embodiment, images of a point to be monitored are produced by the fish-eye camera 60. As compared with using a plurality of usual narrow-angle cameras, system costs can be reduced. Furthermore, as compared with locating, as in FIG. 13, a usual narrow-angle camera over a point to be monitored, the fish-eye camera 60 can be located at a lower position. As a result, equipment for locating a camera can be made compact and device costs can be reduced.

Finally the sixth embodiment of the present invention will be described.

Figure 14:
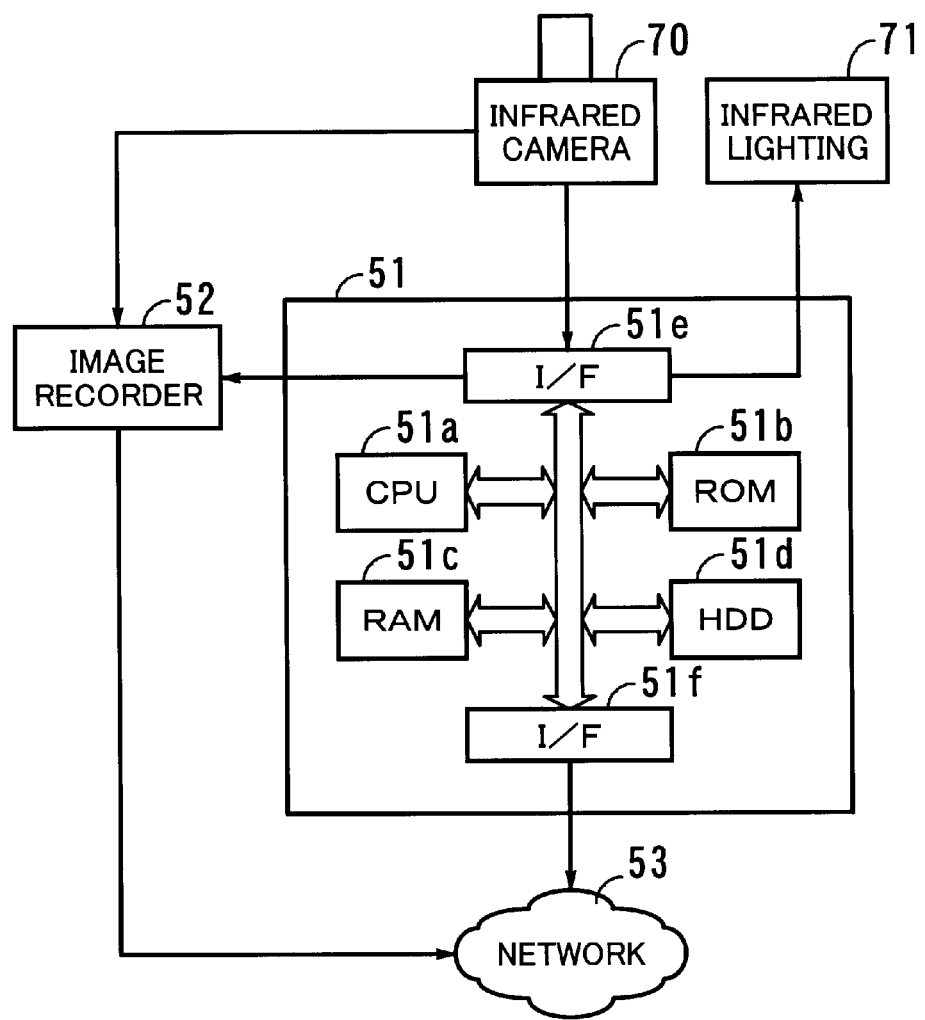
FIG. 14 is a block diagram showing the configuration of a sixth embodiment of the present invention.
Figure 15:
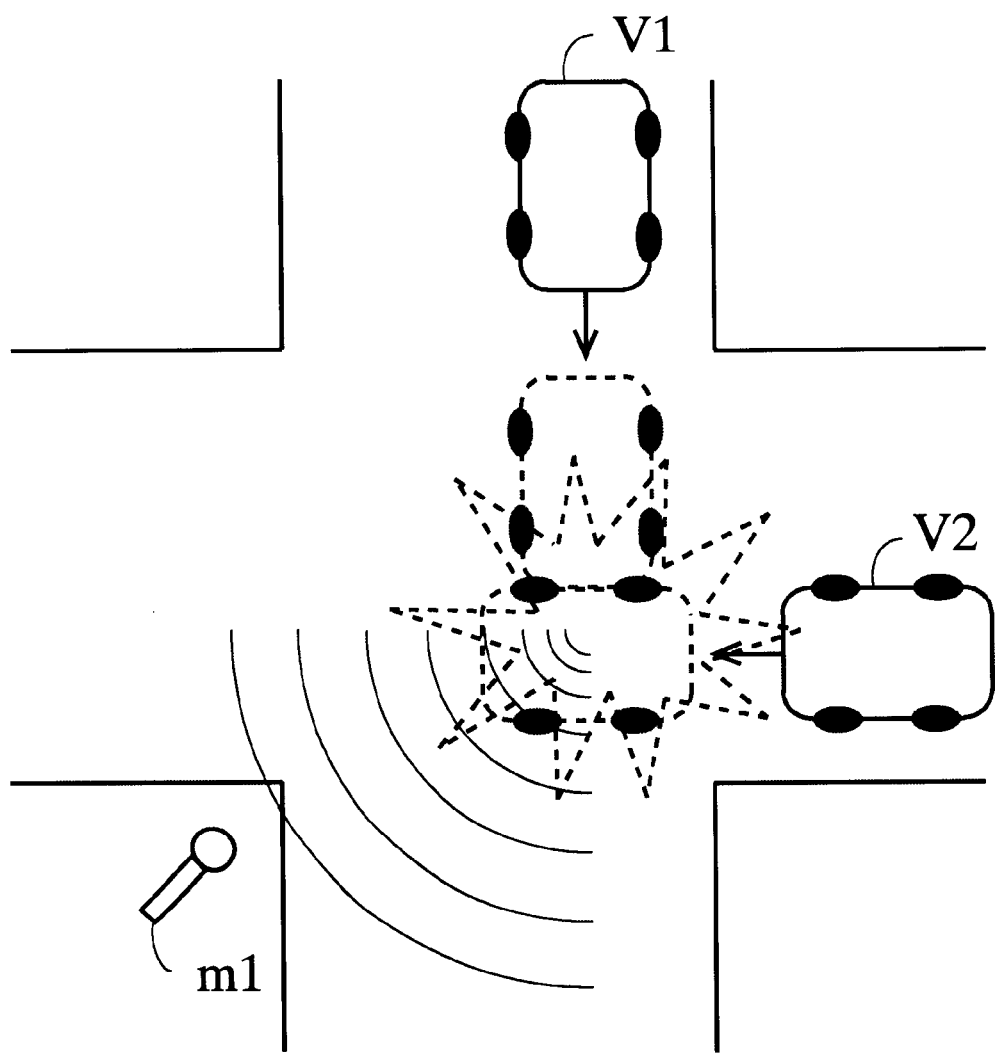
FIG. 15 is a view for describing an operating principle of a conventional traffic monitoring apparatus.
Figure 16:
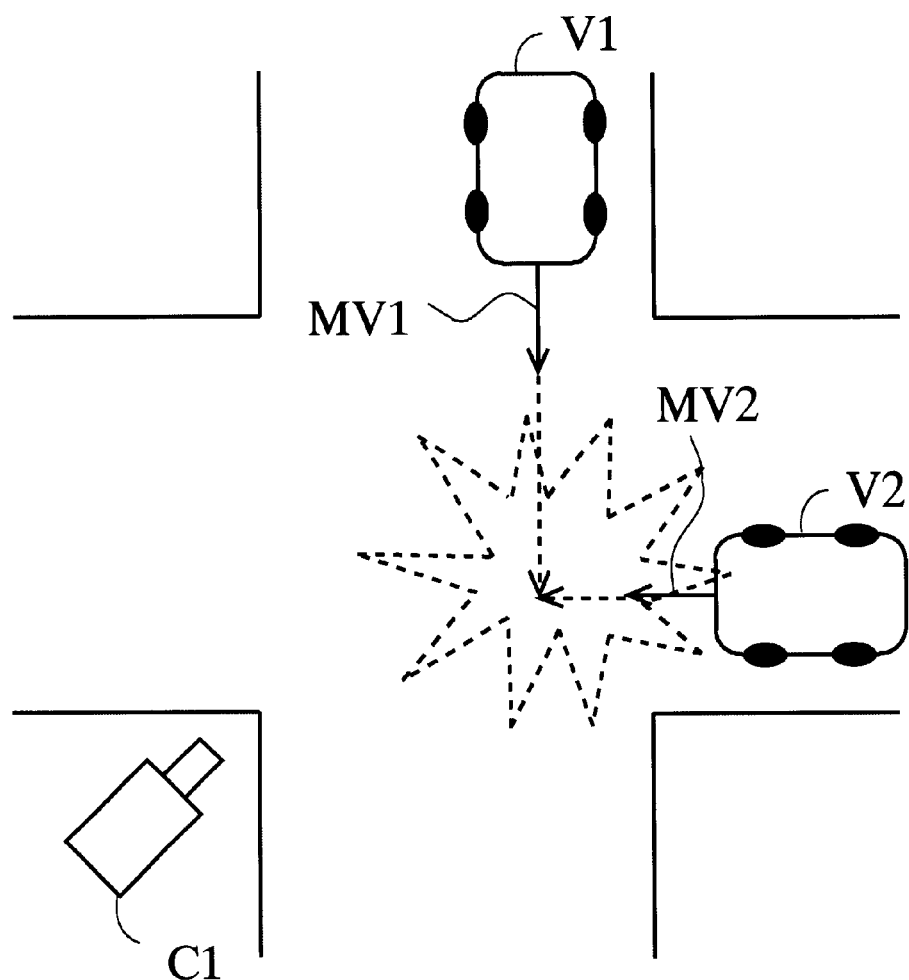
FIG. 16 is a view for describing another operating principle of a conventional traffic monitoring apparatus.

FIG. 14 is a block diagram showing the configuration of the sixth embodiment of the present invention. Sections shown in FIG. 14 which correspond to those in FIG. 5 have the same signs and descriptions of them will be omitted. In this embodiment, an infrared camera 70 is connected instead of the TV camera 50. Additionally, infrared lighting 71 for lighting subjects is connected. The configuration is the same with FIG. 5 except for the above.

The infrared camera 70 is a TV camera with sensitivity to infrared and produces images of a point to be monitored.

The infrared lighting 71 projects infrared on a subject of the infrared camera 70.

Operations in the above embodiment will now be described. The CPU 51a controls the infrared lighting 71 to project infrared on a vehicle or pedestrian, being a subject. As a result, infrared reflected from the subject is detected by the infrared camera 70, is converted into its corresponding image, and is output.

Images output from the infrared camera 70 are supplied to the traffic monitoring apparatus 51, where the same processes that have been described above are performed on them to detect an abnormality in traffic.

In the above embodiment, the traffic situation can be monitored reliably even if it is night.

As stated above, a traffic monitoring apparatus for detecting an abnormality in traffic by monitoring images produced by an imaging device according to the present invention comprises image inputting means for inputting images produced by the imaging device, move vector extracting means for extracting a move vector of an object from images input from the image inputting means, parameter calculating means for calculating parameters in the case of a move vector extracted by the move vector extracting means being considered as a segment, plotting means for plotting parameters for a segment calculated by the parameter calculating means in a two-dimensional coordinate system with the parameters as its bases, and abnormality judging means for judging, in the case of parameters for a segment plotted by the plotting means being plotted in an unusual area, that an abnormality has occurred. The occurrence of an abnormal situation, such as a traffic accident, therefore can be detected reliably.

In addition, a traffic monitoring apparatus for detecting an abnormality in traffic by monitoring images produced by an imaging device according to the present invention comprises image inputting means for inputting images produced by the imaging device, move vector extracting means for extracting a move vector of an object from images input from the image inputting means, position predicting means for predicting the future position of an object by referring to a move vector extracted by the move vector extracting means, distance calculating means for calculating the distance between a pair of objects randomly selected by referring the position of an object predicted by the position predicting means, and judging means for judging, in the case of the distance calculated by the distance calculating means falling below a predetermined threshold, that an abnormality has occurred. A crash therefore can be detected reliably.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A traffic monitoring apparatus for detecting an abnormality in traffic by monitoring images produced by an imaging device, the apparatus comprising:

image inputting means for inputting images produced by the imaging device;

move vector extracting means for extracting a move vector of an object from images input from the image inputting means;

parameter calculating means for calculating parameters in the case of a move vector extracted by the move vector extracting means being considered as a segment;

plotting means for plotting parameters for a segment calculated by the parameter calculating means in a two-dimensional coordinate system with the parameters as its bases; and abnormality judging means for judging, in the case of the parameters for a segment plotted in an unusual area, that an abnormality has occurred, wherein the parameter calculating means calculates the slope and intercept, being parameters, of a segment by performing Hough transformation on the move vector.

2. The traffic monitoring apparatus according to claim 1, wherein the abnormality judging means distinguishes a normal situation from an abnormal situation by the distribution of the parameters of a segment calculated at normal time in the two-dimensional coordinate system.

3. The traffic monitoring apparatus according to claim 1, wherein the move vector extracting means extracts a background image from images input from the image inputting means, specifies areas where a moving object exists by calculating the difference between the background image and a newly input image, and extracts move vectors with priority given to the specified areas.

4. The traffic monitoring apparatus according to claim 1, wherein the imaging device includes a wide-angle lens, further comprising correcting means for correcting images produced by the imaging device to usual images.

5. The traffic monitoring apparatus according to claim 1, wherein the imaging device produces infrared images, further comprising infrared projecting means for projecting infrared light on a subject.

6. A traffic monitoring apparatus for detecting an abnormality in traffic by monitoring images produced by an imaging device, the apparatus comprising:

image inputting means for inputting images produced by the imaging device;

move vector extracting means for extracting a move vector of an object from images input from the image inputting means;

position predicting means for predicting a future position of an object by referring to a move vector extracted by the move vector extracting means;

distance calculating means for calculating the distance between a pair of objects randomly selected by referring to the position of an object predicted by the position predicting means; and judging means for judging, in the case of the distance calculated by the distance calculating means falling below a predetermined threshold, that an abnormality has occurred, wherein the position predicting means calculates an acceleration vector of an object as well and predicts the future position of the object on the basis of its acceleration vector obtained, move vector, and present position.

7. The traffic monitoring apparatus according to claim 6, further comprising:

parameter calculating means for calculating parameters in the case of a move vector extracted by the move vector extracting means being considered as a segment;

plotting means for plotting parameters for a segment calculated by the parameter calculating means in a two-dimensional coordinate system with the parameters as its bases; and abnormality judging means for judging, in the case of the parameters for a segment plotted in an unusual area, that an abnormality has occurred, wherein when the judging means judges that an abnormality has occurred, whether an abnormal situation really has occurred is verified by the parameter calculating means, plotting means, and abnormality judging means.

8. The traffic monitoring apparatus according to claim 6, wherein the move vector extracting means extracts a background image from images input from the image inputting means, specifies areas where a moving object exists by calculating the difference between the background image and a newly input image, and extracts move vectors with priority given to the specified areas.

9. The traffic monitoring apparatus according to claim 6, wherein the imaging device includes a wide-angle lens, further comprising correcting means for correcting images produced by the imaging device to usual images.

10. The traffic monitoring apparatus according to claim 6, wherein the imaging device produces infrared images, further comprising infrared projecting means for projecting infrared light on a subject.

* * * * *